United States Patent [19]

Russell

[11] 3,761,696

[45] Sept. 25, 1973

[54] RANDOM INTEGER GENERATOR AND METHOD

[75] Inventor: Lewis K. Russell, San Jose, Calif.

[73] Assignee: Signetics Corporation, Sunnyvale, Calif.

[22] Filed: Feb. 16, 1972

[21] Appl. No.: 226,700

[52] U.S. Cl. .................................. 235/152, 331/78

[51] Int. Cl. .............................................. G06f 1/02

[58] Field of Search ............................ 235/152, 156; 331/78; 328/27

[56] References Cited

UNITED STATES PATENTS

| | | | |
|---|---|---|---|
| 3,366,779 | 1/1968 | Catherall et al. | 235/152 |
| 3,614,399 | 10/1971 | Linz | 235/152 |
| 3,609,327 | 9/1971 | Paine | 235/152 |
| 3,633,015 | 1/1972 | Lee | 235/152 |
| 3,124,753 | 3/1964 | Gieseler | 331/78 X |

*Primary Examiner*—Charles E. Atkinson
*Assistant Examiner*—James F. Gottman
*Attorney*—Paul D. Flehr et al.

[57] ABSTRACT

A random integer generator formed of a plurality of pseudo-random generators. Each of the pseudo-random generators is formed of a shift register having feedback to maximize the period of the shift register. The shift registers are of different sequence length and are all simultaneously clocked. After a number of clocking pulses, the number of either ones or zeros in a selected sample size of the shift register outputs are counted and summed, with the sum being a random integer.

15 Claims, 6 Drawing Figures

RANDOM INTEGER GENERATOR AND METHOD

BACKGROUND OF THE INVENTION

This invention pertains to integer generators and more particularly pertains to a random integer generator for generating random integers within a predetermined range of integers.

Many applications and systems require a random integer generator for generating random integers within a specified range of integers. For example, in application Ser. No. 145,213 filed May 20, 1971, entitled "Learning Circuit", and which is assigned to the assignee of the present invention, there is disclosed a learning circuit which utilizes a random integer generator. For such applications the requirements for a random integer generator are that it be as random as possible and that it be formed of as few logic elements as possible. The randomness feature ensures a very large number of operations before a sequence is repeated while such a generator should require as few "logic" or "gating" levels as possible in order to minimize the time required. That is, each logic stage or level has a "gating" delay so that the more logic levels there are, the more time is required for generating a random integer.

Accordingly, it is an object of this invention to provide an improved random integer generator for generating random integers in a specified range. It is a particular object of this invention to provide such an integer generator which has very random characteristics and which has a minimum of logic or gating levels.

Briefly, in accordance with one embodiment of the invention, the random integer generator includes a plurality of pseudo-random generators. Each of the pseudo-random generators comprises a shift register formed of a plurality of flip flops having feedback so that the shift register has a maximum sequence length. A clock simultaneously applies clocking pulses to the pseudo-random generators so that they shift bits of information simultaneously. Counting means is provided for counting the number of either ones or zeros in a selected sample size of the outputs of the pseudo-random generators after a predetermined number of clock pulses. The sum of ones or zeros then constitutes the random integer.

DESCRIPTION OF THE PREFERRED EMBODIMENTS

Figure 1:
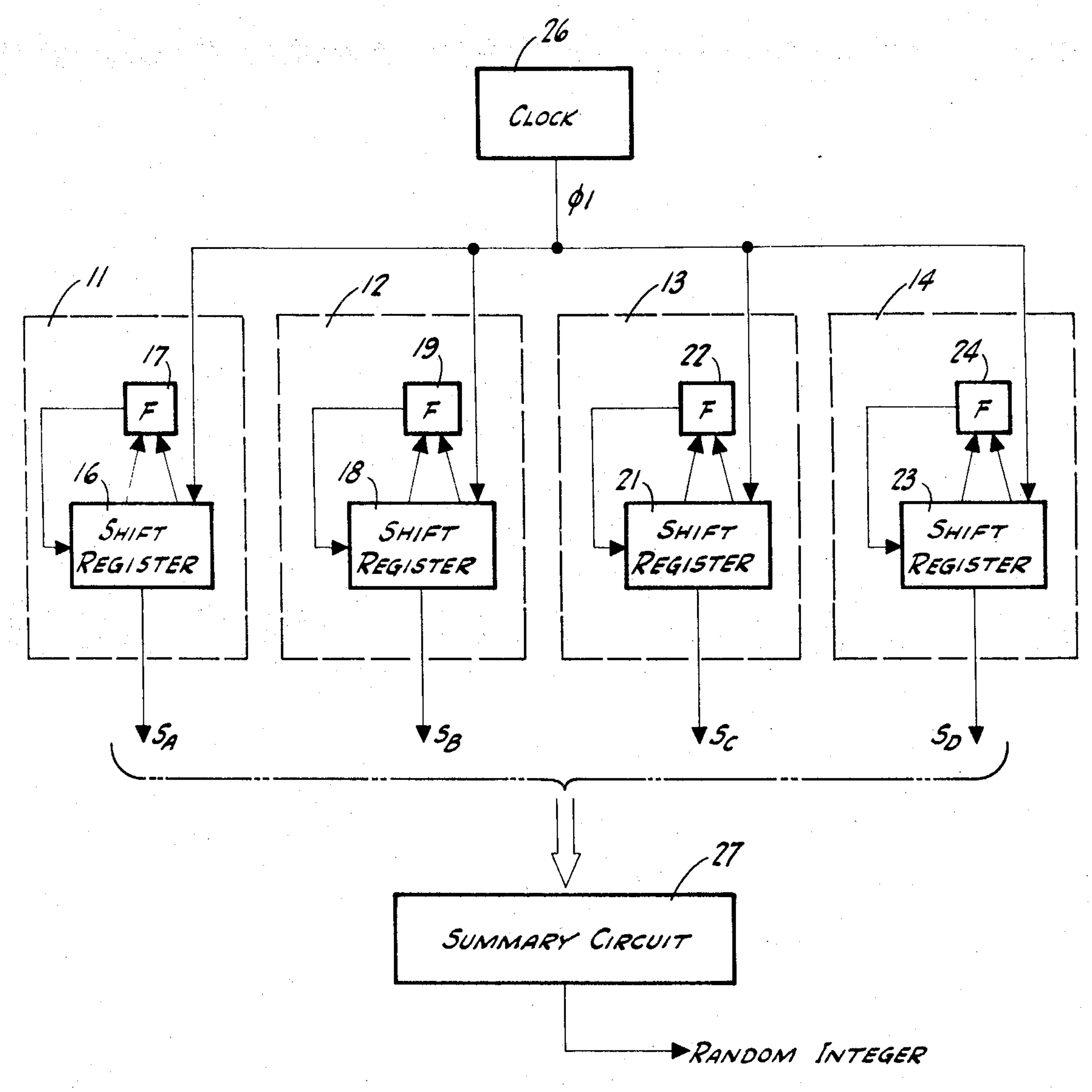
FIG. 1 is a generalized block diagram of a random integer generator in accordance with this invention.

FIG. 1 is a generalized block diagram of a random integer generator in accordance with this invention. Four pseudo-random generators 11, 12, 13 and 14 are provided. Each of these pseudo-random generators comprises a shift register having feedback for producing a maximum sequence length shift register. Thus, pseudo-random generator 11 includes a shift register 16 having feedback means 17; pseudo-random generator 12 includes a shift register 18 having feedback means 19; pseudo-random generator 13 includes a shift register 21 having feedback means 22; and pseudo-random generator 14 includes a shift register 23 having feedback means 24. All of the shift registers 16, 18, 21 and 23 have respective sequence outputs labeled $S_A$, $S_B$, $S_C$ and $S_D$. These sequence outputs are fed into a summing circuit 27 which counts the number of either ones or zeros appearing on the sequence outputs with the total number of such ones or zeros providing an output labeled random integer.

Each of the pseudo-random generators 11 through 14 is constructed in accordance with the configurations described in Appendix II of "Designing With MSI, Vol. I, Counters and Shift Registers", written by Les Brock and published in 1970 by Signetics Corporation. As discussed in that publication, a maximum length linear sequence generator is a shift register with a suitably designed feedback which leads to a sequence with a period $p = 2^n - 1$ where $n$ represents the number of flip flops in the shift register. As further discussed in that article, suitable zero suppression circuitry can also be supplied to keep the shift register out of the all zero state, in which case the feedback would simply apply another zero to the serial input. This would result in the shift register continuing in an all zero state. One suitable procedure, for example, is simply to load all ones whenever the all zero condition appears. As demonstrated in the above-referenced article, which is hereby incorporated by reference, the output of such a maximum length shift register has pseudo-random property which approximates a binomial distribution for sample sizes small in comparison to the shift register length.

In accordance with this invention and as shown in FIG. 1, a plurality of these pseudo-random generators are grouped together and are simultaneously clocked so that they generate simultaneous outputs. As will be discussed more fully hereinafter, by combining a plurality of these pseudo-random generators and summing their outputs, a random integer generator is formed having an essentially binomial distribution.

Figure 2:
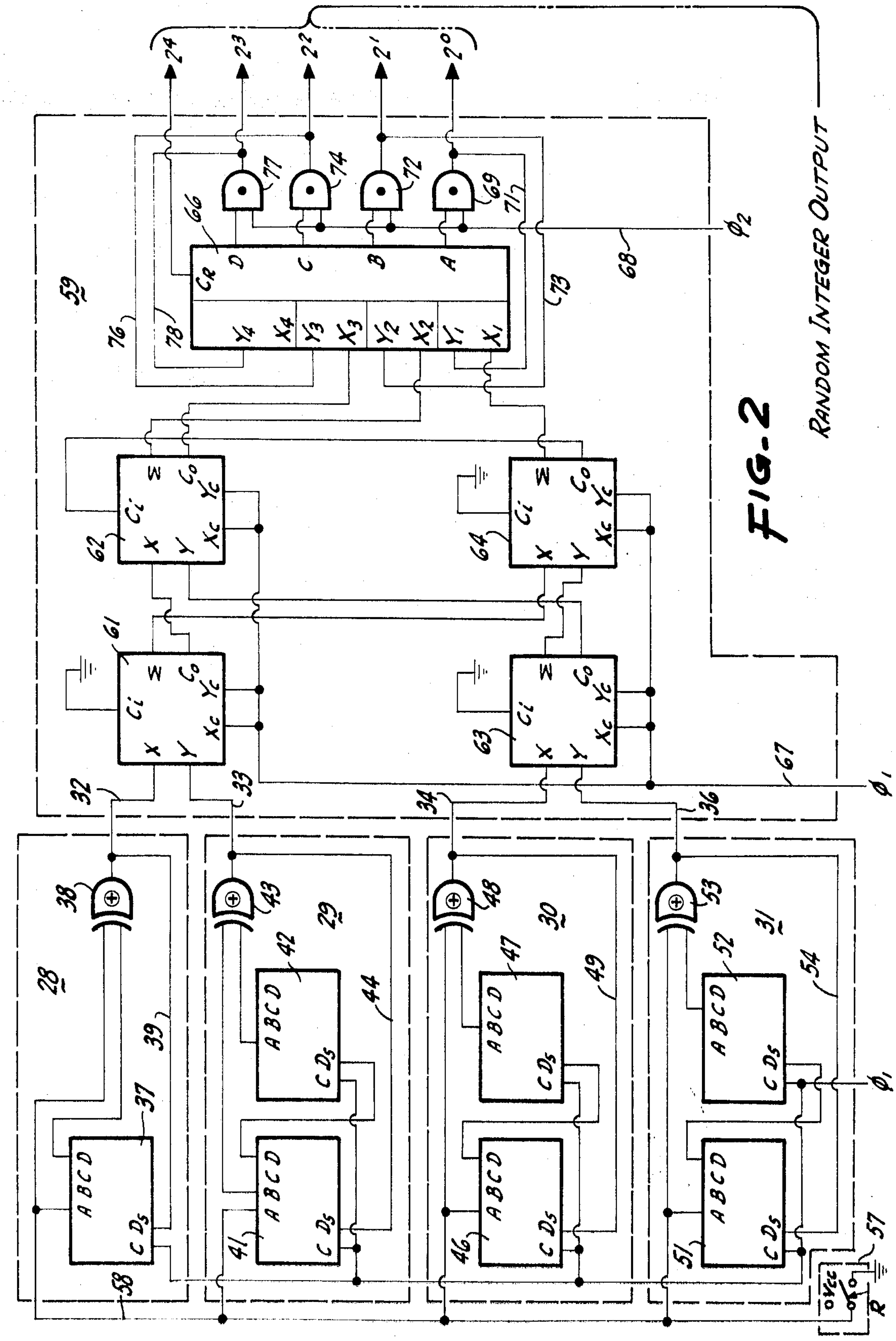
FIG. 2 is a block diagram of one embodiment of the invention which utilizes full adders and a four bit adder for summing the outputs of the shift registers.

Referring now to FIG. 2, there is shown a block diagram of one embodiment of the invention which utilizes full adders and a four bit adder for summing the outputs of the pseudo-random generators.

Four pseudo-random generators are shown in FIG. 2 and are respectively designated by reference numerals 28, 29, 30 and 31. Each of the pseudo-random generators 28 through 31 is formed of a shift register having suitable feedback to produce a maximum sequence length. In accordance with this invention the sequence length of the combination of pseudo-random generators and hence the "randomness" or extent to which the final output integer approximates a true binomial distribution, is dependent upon the respective sizes of the pseudo-random generators, the number of pseudo-random generators employed, and having the pseudo-random generators that are employed be of different sequence lengths. Thus, in accordance with one embodiment of this invention and as illustrated in FIG. 2, four pseudo-random generators 28 through 31 are employed. Further, in accordance with this one embodiment, pseudo-random generator 28 has a four bit length, pseudo-random generator 29 has a five bit length, pseudo-random generator 30 has a six bit length, and pseudo-random generator 31 has a seven bit length. As demonstrated in the article referred to above in the publication "Designing with MSI, Vol. I, Counters and Shift Registers", the four bit pseudo-random generator 28 has a period on its output circuit 32 of 15; the five bit pseudo-random generator 29 has a period on its output circuit 33 of 31; the six bit pseudo-random generator 30 has a period on its output 34 of 63; and the seven bit pseudo-random generator 31 has a period on its output circuit 36 of 127.

The pseudo-random generator 28 comprises a four bit shift register 37 having four flip flops or bits which are labeled A through D. The shift register 37 also has a clock input C and a serial shifting input labeled $D_S$. Suitable circuits for shift register 37 are well known in the art and one example of a suitable circuit is an integrated circuit manufactured by Signetics Corporation and identified as Package No. 8270. The A and D flip flops or bits of the shift register 37 form inputs to an exclusive OR gate 38, the output of which is output 32 for the pseudo-random generator 28. This output 32 of the exclusive OR gate 38 is fed back via circuit 39 to the serial shifting input $D_S$ of the shift register 37.

In pseudo-random generator 29 two four-bit shift registers 41 and 42 are combined to form a five-bit shift register. Thus the D flip flop or bit of shift register 41 is connected to the serial shifting input $D_S$ of shift register 42 with the A flip flop or bit of shift register 42 and the B flip flop or bit of shift register 41 connected to an exclusive OR gate 43, the output of which is the output 33 of the pseudo-random generator 29. This output 33 is fed back by a feedback circuit 44 to the serial shifting input $D_s$ of the shift register 41. To couple the shift register 41 to the shift register 42 the last flip flop or bit which is the D bit of the shift register 41 is connected to the serial shifting input $D_s$ of the shift register 42. Each of the shift registers 41 and 42 can be identical to the shift register 37.

The pseudo-random generator 30 includes a six flip flop or bit shift register formed of two four bit shift registers 46 and 47. The last flip flop or bit of the shift register 46 which is the D bit is connected to the serial shifting input $D_s$ of the shift register 47. The B flip flop or bit of the shift register 47 together with the A flip flop or bit of the shift register 46 form inputs to an exclusive OR gate 48, the output of which is the output 34 of the pseudo-random generator 30. This output 34 is also coupled via feedback circuit 49 to the serial shifting input $D_s$ of the shift register 46. The shift registers 46 and 47 can also be identical to the shift register 37.

The pseudo-random generator 31 includes a seven flip flop or bit shift register which is formed of two four bit shift registers 51 and 52. A seven bit shift register is formed by connecting the last flip flop or bit which is the D bit of the shift register 51 to the serial shifting input $D_S$ of the shift register 52. The C flip flop or bit of the shift register 52 and the A flip flop or bit of the shift register 51 form inputs to an exclusive OR gate 53, the output of which is the output 36 of the pseudo-random generator 31. This output 36 is also fed back by a feedback circuit 54 to the serial shifting input $D_S$ of the shift register 51.

The clock inputs of the four bit shift registers 37, 41, 42, 46, 47, 51 and 52 are all connected by a clock circuit 56 to a clock signal $\phi$1. Thus all the shift registers or pseudo-random generators are clocked simultaneously so that they shift simultaneously.

As discussed before, for shift registers with feedback some suitable zero suppression means must be provided to prevent the condition of a shift register starting in an all zero condition, with zero being fed back to the shift register indefinitely. As shown in FIG. 2, a reset switch 57 is provided which is connected by a circuit 58 to the A flip flops or bits of the shift registers 37, 41, 46 and 51. The reset switch 57 is switchable between ground and a source of voltage $V_{cc}$ in order to set all the A or first flip flops in the shift registers 37, 41, 46 and 51 to the one state.

Thus, for each clock pulse $\phi$1 either a one or a zero will respectively appear on the outputs 32, 33, 34 and 36. The outputs 32, 33, 34 and 36 form inputs to a summing circuit 59 which counts, for example, the number of ones appearing on these outputs. The summing circuit 59 includes four full adders indicated by reference numeral 61, 62, 63 and 64, and a four bit adder indicated by reference numeral 66. Each of the full adders 61 through 64 may be identical and suitable circuits are well known in the art. For example, each of these full adders may comprise an integrated circuit manufactured by Signetics Corporation and identified as Package No. 8268. Each of these full adders has inputs X, Y, $C_i$, and clock inputs for the X and Y inputs indicated by $X_C$ and $Y_C$. Each of these full adders also has as outputs a sum Σ and a carry out $C_o$. A truth table for such a full adder is as follows:

| X | Y | $C_i$ | Σ | $C_o$ |
|---|---|---|---|---|
| 0 | 0 | 0 | 0 | 0 |
| 1 | 0 | 0 | 1 | 0 |
| 1 | 1 | 0 | 0 | 1 |
| 1 | 1 | 1 | 1 | 1 |

The output 32 of pseudo-random generator 28 is connected to the X input of full adder 61 and the output 33 of pseudo-random generator 29 is connected to the Y input of full adder 61. The output 34 of pseudo-random generator 30 is connected to the X input of full adder 63 and the output 36 of pseudo-random generator 31 is connected to the Y input of full adder 63. The carry input $C_i$ of both full adders 61 and full adder 63 are grounded. The sum output Σ of full adder 61 is connected to the X input of full adder 64 and the sum output Σ of full adder 63 is connected to the Y input of full adder 64. The carry input $C_i$ of full adder 64 is grounded. The carry output of full adder 61 is connected to the X input of full adder 62 and the carry output of full adder 63 is connected to the Y input of full adder 62. All of the clocks inputs $X_C$ and $Y_C$ for full adders 61 through 64 are connected via a clock circuit 67 to a clock $\phi$1. Thus, full adders 64 adds the sum of the full adders 63 and 61with the carry output $C_o$ of full adder 64 being connected to the carry inputs $C_i$ of full full adder 62, the X and Y inputs to which ar ethe carry outputs of the full adders 61 and 63.

The four bit adder 66 has four sets of X, Y inputs labeled $X_1$, $Y_1$, $X_2$, $Y_2$ etc. The sum output of the full adder 64 is connected to the $X_1$ input of four bit adder 66 and the sum output of full adder 62 is connected to the $X_2$ input of four bit adder 66. The carry out signal of full adder 62 is connected to the $X_3$ input of four bit adder 66. The four bit adder 66 is a four digit binary output labeled A, B, C and D and also has a carry output $C_R$. The A output of the four bit adder 66 is ANDed with a clock signal on clock circuit 68 from clock $\phi 2$ in an AND gate 69 to form the $2^0$ output. The $2^0$ output is fed back by a feedback circuit 71 to the $Y_1$ input of four bit adder 66. Similarly, the B output of four bit adder 66 is ANDed with the $\phi 2$ signal in an AND gate 72 to form the $2^1$ output which also is fed back by a feedback circuit 73 to the $Y_2$ input of four bit adder 66. The C output of four bit adder 66 is ANDed in an AND gate 74 with the $\phi 2$ clock signal to form the $2^2$ output which is fed back via feedback circuit 76 to the $Y_3$ input of four bit adder 66. The D output of four bit adder 66 is ANDed in an AND gate 77 with the $\phi 2$ clock signal to form the $2^3$ output which is fed back via feedback circuit 78 to the $Y_4$ input of four bit adder 66. The carry output $C_R$ form the $2^4$ output of four bit adder 66. Thus the five digit binary number labeled random integer output is the sum of the ones being generated by the pseudo-random generators 28 through 31. Suitable circuits for the four input adder 66 are well known in the art and one suitable circuit is an integrated circuit manufactured by Signetics Corporation and designated as Package No. 8260. In accordance with this one embodiment the relationship between the $\phi 1$ and $\phi 2$ clocks are such that there are, for example, four $\phi 1$ clock pulses for every $\phi 2$ clock pulses. In this way the number of ones generated at the outputs of the exclusive OR gates as the shift registers are shifted four times are summed to provide the random integer output. The range of integers throughout which the random integers are generated is easily adjustable by varying the relationship between the clocks $\phi 1$ and $\phi 2$. Thus with four pseudo-random generators and with the ones they generate as they are shifted four times being summed, the maximum number of ones that could be summed is four times four or 16 and the minimum number is zero. Thus the range of integers is 0 to 16.

Figure 3:
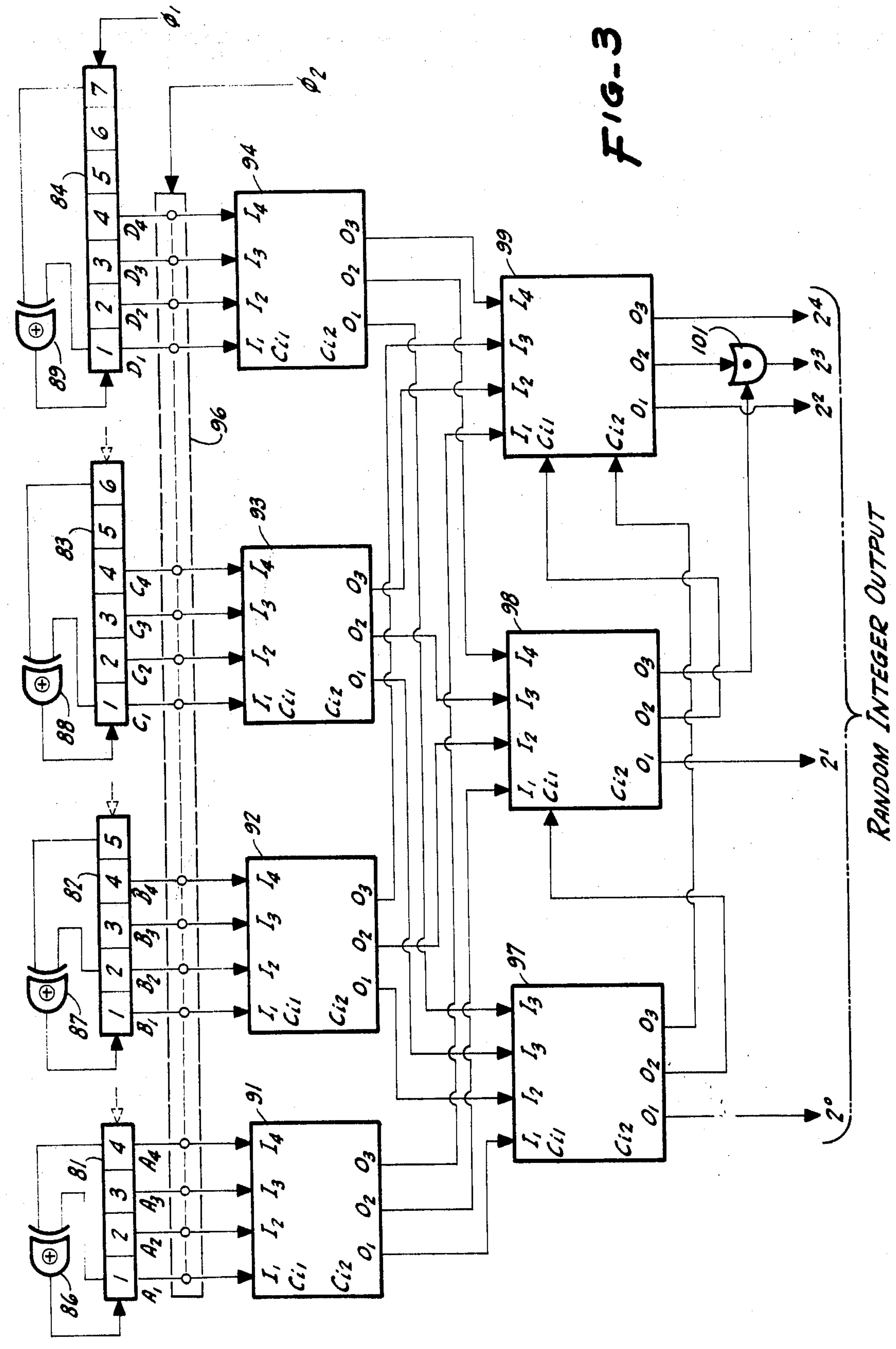
FIG. 3 is a generalized block diagram of one embodiment of the invention in which summing is accomplished using a plurality of four input adders having two input carrys.

Referring now to FIG. 3 there is shown a generalized block diagram of one embodiment of the invention forming a random integer generator with a binomial distribution across the range 0 to 16 and centered about the number 8. Four shift registers 81 through 84 of bit lengths 4, 5, 6 and 7 respectively, are each provided with feedback means in the form of exclusive OR gates 86 through 89, respectively, in the manner as discussed before in connection with FIG. 2. All the shift registers 81 through 84 are adapted to be simultaneously clocked by $\phi 1$ clocking means. In accordance with this invention four outputs are taken from each of the shift registers 81 through 84 with each output corresponding to the state of one of the flip flops in that particular shift register. Taking four outputs for one clock pulse is the same as taking one output for four clock pulses as is the case for the circuitry of FIG. 2. Thus shift register 81 has four outputs A1 through A4; shift register 82 has four outputs labeled B1 through B4; shift register 83 has four outputs labeled C1 through C4; and shift register 84 has four outputs labeled D1 through D4. Four adders 91 through 94 are respectively provided for receiving as inputs the outputs of the shift registers 81 through 84. In accordance with this invention the outputs of the shift registers 81 through 84 are coupled to the adders 91 through 94 through means such as an AND gate assembly 96 which is only schematically shown in FIG. 3. The AND gate assembly 96 is actuated by an additional clocking input $\phi 2$ to only couple the shift register outputs to the adder in response to a $\phi 2$ clock impulse. The $\phi 2$ clock can thus serve as an "access" signal so that a random integer is only generated when desired. Each of the adders 91 through 94 are identical and comprise, for example, a four input, two carry-in adder. A truth table for such an adder is as follows:

TRUTH TABLE.—FOUR INPUT TWO CARRY IN ADDER [1]

| $I_1$ | $I_2$ | $I_3$ | $I_4$ | $C_i1$ | $C_i2$ | $O_1$ | $O_2$ | $O_3$ |
|---|---|---|---|---|---|---|---|---|
| 0 | 0 | 0 | 0 | 0 | 0 | 0 | 0 | 0 |
| 1 | 0 | 0 | 0 | 0 | 0 | 1 | 0 | 0 |
| 1 | 1 | 0 | 0 | 0 | 0 | 0 | 1 | 0 |
| 1 | 1 | 0 | 0 | 0 | 0 | 1 | 1 | 0 |
| 1 | 1 | 1 | 1 | 0 | 0 | 0 | 0 | 1 |
| 1 | 1 | 1 | 1 | 1 | 0 | 1 | 0 | 1 |
| 1 | 1 | 1 | 1 | 1 | 1 | 0 | 1 | 1 |

[1] Permutations of Inputs not shown.

The permutations of the various inputs are not shown in this truth table. Thus the outputs $0_1$ through $0_3$ of the adders 91 through 94 generate the sum of the ones which were present at the inputs to these adders. The outputs of adders 91 through 94 are, in turn, coupled to the inputs of adders 97 through 99. The above truth table also holds for these adders 97 through 99. As can be seen in FIG. 3 the output $0_1$ of adder 91 is connected to the input $I_1$ of adder 97 with the $0_2$ and $0_3$ outputs of adder 91 being respectively connected to the $I_1$ inputs of adders 98 and 99, The $0_1$ output of adder 92 is connected to the $I_2$ input of adder 97; the $0_2$ output of adder 92 is connected to the $I_2$ input of adder 98; and the $0_3$ output of adder 92 is connected to the $I_3$ input of adder 99. The $0_1$ output of adder 93 is connected to the $I_3$ input of adder 97; the $0_2$ output of adder 93 is connected to the $I_3$ input of adder 98; and the $0_3$ output of adder 93 is connected to the $I_2$ input of adder 99. The $0_1$ output of adder 94 is connected to the $I_4$ input of adder 97 and the $0_2$ and $0_3$ outputs of adder 94 are respectively connected to the $I_4$ input of adders 98 and 99.

The $0_1$ output of adder 97 forms the $2^0$ digit of the random integer output. the $0_2$ output of adder 97 is connected to the $C_i1$ input of adder 98 and the $0_3$ output of adder 97 is connected to the $C_i2$ input of adder 99. The $0_1$ output of adder 98 forms the $2^1$ digit of the random integer output with the $0_2$ output of adder 98 being connected to the $C_i1$ input of adder 99. The $0_3$ output of adder 98 forms an input to an AND gate 101. The $0_1$ output of adder 99 forms the $2^2$ digit of the random integer output. The $0_2$ output of adder 99 also forms an input to the AND gate 101 with the output of AND gate 101 forming the $2^3$ digit of the random integer output. The $0_3$ output of adder 99 forms the $2^4$ digit of the random integer output.

In operation, when the access clock $\phi 2$ carries a signal the outputs or states of four flip flops or bits in each of the shift registers are coupled into the summing circuitry. Since there are sixteen inputs the range of the random integer output will be between zero and 16 with the integer output being random and distributed according to a binomial distribution with a center point of 8. This range and center point can easily be adjusted, of course, by monitoring the states of more or less than 16 flip flops. Computer studies have shown that utilizing the circuitry of FIG. 3, and counting only ones in the outputs of the shift registers, that more than 78 million random integers will be generated before there is a repeat of a sequence. This large number of generated integers before there is a repeat of sequence for all intents and purposes is a binomial distribution. This large "period" is achieved by using a plurality of shift registers in pseudo-random generator configuration wherein at least some of the period of the maximum sequence length pseudo-random generators are prime numbers.

An even larger number of integers can be generated before there is a repeat of a sequence if ones and zeros are alternately counted. To alternately count ones and zeros every other integer appearing at the random integer output of the circuitry shown in FIG. 3 would, of course, be subtracted from 16 to give the number of zeros. Suitable circuitry for accomplishing this is, of course, well known in the art. Computer studies have shown that when alternately counting ones and zeros, more than 160 million random integers will be generated before there is a repeat of a sequence. This is even closer to an exact binomial distribution which, in accordance with the embodiment shown in FIG. 3, will have a range from 0 to 16 and be centered about the integer 8. The range and center point can, of course, be adjusted by counting more or less states of flip flops in more or less shift registers.

Figure 4:
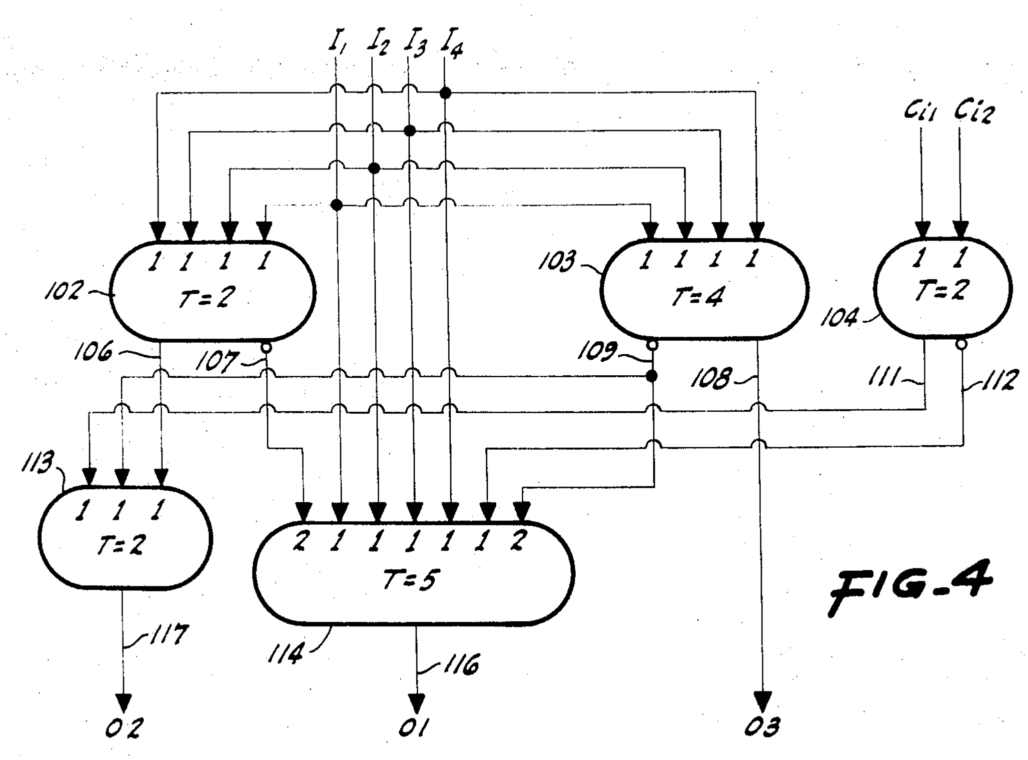
FIG. 4 is a block diagram of a threshold logic implementation of a four input adder having two input carry such as utilized in the circuit of FIG. 3.

Turning now to the consideration of FIG. 4, there is shown in block diagram form suitable circuitry for forming the four input two carry-in adders shown and described in connection with respect to FIG. 3. The ovals shown in FIG. 4 represent threshold logic circuits where "T=" gives the threshold value of the circuit and the small numbers opposite the input arrows shown the input weights. Threshold logic circuits are known in the art and have advantages over conventional Boolean realizations in terms of reduced numbers of components and improved power and speed. A discussion of the operation of threshold logic circuits and discrete circuitry for forming such threshold logic circuits may be found in an article entitled "Threshold Logic" by Hampel and Winder, appearing at pages 32 through 39 of the IEEE Spectrum for May of 1971.

In FIG. 4 two threshold logic circuits 102 and 103 are provided which respectively have threshold values of 2 and 4. The inputs $I_1$, $I_2$, $I_3$ and $I_4$ all form inputs having a weighted value of 1 to both of the threshold logic circuits 102 and 103. A threshold logic circuit 104 is also provided which has a threshold value of 2 and to which inputs $C_i1$ and $C_i2$ form inputs having a weighted value of 1. The threshold logic circuit 102 has an output on a circuit 106 and an inverted output on a circuit 107. Similarly, the threshold logic 103 has an output on a circuit 108 and an inverted output on a circuit 109. Likewise, the threshold logic circuit 104 has an output on a circuit 111 and an inverted output on a circuit 112. A threshold logic circuit 113 is provided which receives as inputs having the weight 1 the output of threshold logics circuit 104 appearing on circuit 111, the inverted output of threshold logic circuit 103 appearing on circuit 109 and the output of threshold logic circuit 102 appearing on circuit 106. The threshold logic circuit 113 has a threshold value of 2.

An additional logic circuit 114 is provided which has a threshold value of 5. Threshold logic circuit 114 has inputs $I_1$, $I_2$, $I_3$ and $I_4$ which all have the weighted value of 1. Threshold logic circuit 114 also receives the inverted output of threshold logic circuit 104 appearing on circuit 112 as an input having a weighted value of 1. The threshold logic circuit 114 has an input having the weighted value 2 the inverted output of threshold logic circuit 102 appearing on circuit 107 and also the inverted output of threshold logic circuit 103 appearing on circuit 109. The output of threshold logic circuit 114 appearing on circuit 116 is the output $0_1$. The output of threshold logic circuit 113 appearing on circuit 117 is the output $0_2$. The output of threshold logic circuit 103 appearing on circuit 108 is the output $0_3$. In operation, as explained before, the number shown opposite the inputs to the threshold logic circuits are weighting values and the T values are threshold values for the circuits. If the sum of weights of "on" inputs equals or exceeds the threshold values for a threshold logic circuit, the output changes from a zero to a one or, for the inverted outputs which are shown in each case by a circle, the inverted output changes from a one to a zero. Each oval in the configuration of FIG. 4 represents one gate delay. Thus, in the configuration of FIG. 4 where there is shown a four input, two carry-in adder, two of its outputs have two gate delays and one of its outputs has one gate delay, which forms a very rapid acting circuit. The truth table for the circuitry of FIG. 4 is the same truth table as shown above and as described in connection with FIG. 3.

Figure 5:
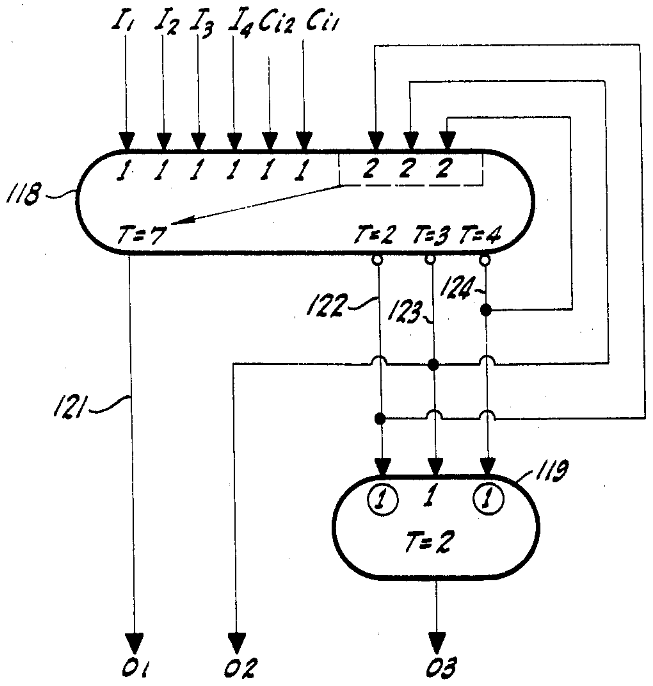
FIG. 5 is a block diagram of another embodiment of a threshold logic implementation of a four input adder having two input carry.

An alternate embodiment of a four input two carry-in full adder utilizing threshold logic circuitry, is shown in FIG. 5. The adder of FIG. 5 utilizes two threshold logic circuits 118 and 119. As before, the number shown opposite the inputs to the threshold logic circuits are weighting values, the T values given opposite the outputs are threshold values whereby if the sum of weights of "on" inputs equals or exceeds the threshold value the output changes from a zero to a one and the inverted outputs (shown by a circle) changes from a one to a zero. Each oval in the threshold logic circuit is one gate delay. Inputs generated by feedback from the inverted outputs only apply to the regular non-inverted output which is shown in FIG. 5 by a dashed fence with an arrow in logic circuit 118. In FIG. 5 circles around input weight values show that input to be inverted inside the threshold logic circuit. For example, the inverted output T equals 6 is used for feedback in logic circuit 118, but is re-inverted upon entering threshold logic circuit 119 so that it appears to be a non-inverted or true T equals 6 input.

Thus in FIG. 5 the threshold logic circuit 118 has as one weighted inputs the inputs $I_1$ through $I_4$. The input $C_i1$ has a weighted value of 1 but is inverted upon entering the threshold logic circuit 118. The input $C_i2$ also has a weighting value of 1. The threshold of logic circuit 118 has a T equal 7 output on a circuit 121 which is labeled $0_1$. Threshold logic circuit 118 has an inverted T equals 2 output on a circuit 122, an inverted T equals 4 output on a circuit 123 and an inverted output T equals 6 on a circuit 124. These inverted outputs of threshold logic gate 118 are fed back as inputs into threshold logic gate 118 and have a weighted value of 2 to the logic circuit 118 but only apply to the non-inverted T equal 7 output. The inverted T equals 2, T equals 4 and T equals 6 outputs from threshold logic circuit 118, which appear respectively on circuits 122, 123 and 124, form inputs to the threshold logic circuit 119. The T equals 2 inverted output on circuit 122 and the T equals 6 inverted output on circuit 124 are re-inverted upon entering the threshold logic circuit 119.

The threshold logic circuit 119 has a threshold value of T equals 2 and has an output labeled $0_2$. The inverted T equals 4 output on circuit 123 forms an output labeled $0_3$. The truth table for the threshold logic circuit arrangement of FIG. 5 is as follows:

TRUTH TABLE FOR FOUR INPUT TWO CARRY IN ADDER $\bar{O}_3$

| $I_1$ | $I_2$ | $I_3$ | $I_4$ | $C_i1$ | $C_i2$ | $\bar{T}2$ | $\bar{T}4$ | $\bar{T}6$ | $O_1$ | O2 |
|---|---|---|---|---|---|---|---|---|---|---|
| 0 | 0 | 0 | 0 | 0 | 0 | 1 | 1 | 1 | 0 | 0 |
| 1 | 0 | 0 | 0 | 0 | 0 | 1 | 1 | 1 | 1 | 0 |
| 1 | 1 | 0 | 0 | 0 | 0 | 0 | 1 | 1 | 0 | 1 |
| 1 | 1 | 1 | 0 | 0 | 0 | 0 | 1 | 1 | 1 | 1 |
| 1 | 1 | 1 | 1 | 0 | 0 | 0 | 0 | 1 | 0 | 0 |
| 1 | 1 | 1 | 1 | 1 | 0 | 0 | 0 | 1 | 1 | 0 |
| 1 | 1 | 1 | 1 | 1 | 1 | 0 | 0 | 0 | 0 | 1 |

Two of the outputs $0_2$ and $0_3$ may be used as inputs for higher order adders. Since the $0_3$ output is inverted, it can be either re-inverted or alternatively one of the carry-in inputs on higher order adders can be inverted to make interconnection simple.

As mentioned before, each of the adders in FIG. 3 is formed of threshold logic circuitry such as shown in FIG. 5. Each oval in the circuitry of FIG. 5 represents one gate delay. Thus for the summing arrangement shown in FIG. 3, when all of the 16 outputs A1 through A4, B1 through B4, C1 through C4 and D1 through D4 are presented at once, the gate delays to the output are four gate delays for the $2^0$ bit, six gate delays for the $2^1$ bit, eight gate delays for the $2^2$ bit and for the $2^3$ bit, and seven gate delays for the $2^4$ bit. This represents very fast acting circuitry for adding four four-bit binary numbers and getting a five bit output.

Figure 6:
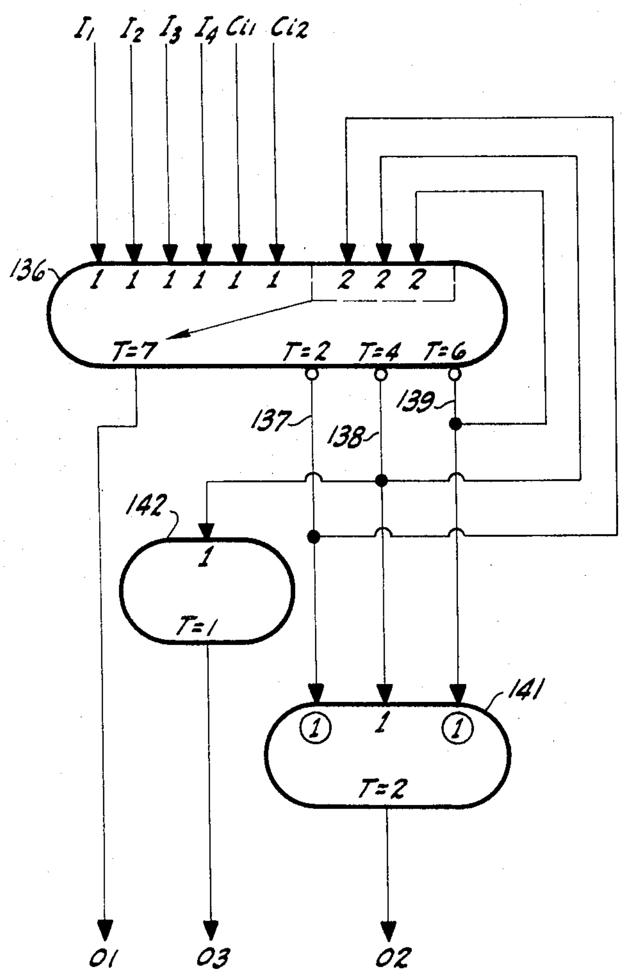
FIG. 6 is a block diagram of a threshold logic implementation of a four input three carry in full adder suitable for use in the circuit of FIG. 3.

Referring now to FIG. 6 there is shown a four input two carry-in adder which has three outputs $0_1$, $0_2$ and $0_3$ and all three outputs of which have two gate delays. A threshold logic circuitry 136 has four inputs $I_1$ through $I_4$ which all have an input weighting value of 1 and has two carry-in inputs $C_i1$ and $C_i2$ which also have a weight in input of 1. The threshold logic circuit 136 has three inverted outputs having threshold values of 2, 4 and 6 and which appear on circuits 137, 138 and 139, respectively. These three inverted outputs on circuits 137 through 139 are fed back as inputs into the threshold logic circuitry 136 having weighted input values of 2. These inputs having weighted input values of 2 only affect the non-inverted output T equal 7 of the threshold logic circuit 136 as indicated by the dashed line enclosing the two weighted inputs and the arrow coupling these inputs to the non-inverted seven level threshold output. The three inverted outputs on circuit 137, 138 and 139 form inputs to a threshold logic circuit 141. All three inputs have a weighted input value of 1 although the inputs from circuit 137 and 139 are inverted as indicated by the circles surrounding the weighting value for these inputs. The threshold logic circuit 141 has a threshold value of T equals 2 and an output labeled $0_2$. The inverted output for T equals 4 of threshold logic circuit 136, which appears on circuit 138, is coupled as a one weighted input to a threshold logic circuit 142. The threshold of threshold logic circuit 142 is T equals 1 and the threshold logic circuit 142 has its output inverted as indicated by the circle at the output to form the output $0_3$. The non-inverted output T equals 7 for the threshold logic circuit 136 forms an output $0_1$.

Thus the arrangement of FIG. 6 forms a four input two carry-in full adder where all three outputs $0_1$, $0_2$ and $0_3$ have two gate delays. The adder shown in FIG. 6 can be utilized in a summing configuration such as shown in FIG. 3 for summing the four four-bit outputs of the pseudo-random generators.

Thus what has been described is a random integer generator in which the range of integers generated and the center point of the distribution can be controlled and in which many millions of integers can be generated before a sequence repeats itself. Thus the integers generated are, indeed, random and are essentially binomially distributed through the range of integers. As the preferred embodiments a plurality of pseudo-random generators each comprising a shift register having feedback in order to maximize the shift register's period are utilized. The shift registers or pseudo-random generators are of different bit lengths and summing means are provided for counting the number of ones for example, in selected sample sizes of the shift register bits. In accordance with some embodiments of the invention, threshold logic circuitry can be utilized for counting or summing the number of ones, with such threshold logic circuitry offering the advantages of a minimum number of components and very high speed operation.

I claim:

1. A random integer generator comprising a plurality of pseudo-random generators, each of said pseudo-random generators comprising a shift register formed of a plurality of flip flops having feedback whereby the sequence of the shift register has a period $p = 2^n - 1$ where $n$= the number of flip flops in the shift register, clock means for simulteneously applying clocking pulses to said plurality of pseudo-random generators whereby they shift bits of information simultaneously, summing means for counting the number of either ones or zeros in a predetermined selected sample size of the outputs of the pseudo-random generators to form the sum thereof whereby the sum is a random integer.

2. A random integer generator comprising a plurality of pseudo-random generators, each of said pseudo-random generators comprising a shift register formed of a plurality of flip flops having feedback whereby the sequence of the shift register has a period $p = 2^n - 1$ where $n$ = the number of flip flops in the shift register, and wherein said pseudo-random generators are each of different sequence length from each other, clock means for simultaneously applying clocking pulses to said plurality of pseudo-random generators whereby they shift bits of information simultaneously, summing means for counting the number of either ones or zeros in a predetermined selected sample size of the outputs of the pseudo-random generators to form the sum thereof whereby the sum is a random integer.

3. A random integer generator in accordance with claim 2 wherein at least one of the pseudo-random generators has a sequence length which is a prime number.

4. A random integer generator in accordance with claim 1 wherein said pseudo-random generators are clocked repeatedly so that they shift repeatedly prior to counting the number of ones or zeros in their outputs.

5. A random integer generator in accordance with claim 2 comprised of four pseudo-random generators.

6. A random integer generator in accordance with claim 5 wherein the four pseudo-random generators are comprised of four shift registers having, respectively, four, five, six and seven flip flops or bits so that with the feedback they have maximum periods which are respectively 15, 31, 63 and 127.

7. A random integer generator in accordance with claim 6 wherein each of said four shift registers has a serial shifting input and wherein feedback means for the four flip flop shift register comprises an exclusive OR gate having two inputs connected respectively to the first and fourth flip flops and an output connected to the serial shifting input of the shift register, the feedback means for the five flip flop shift register comprises an exclusive OR gate having two inputs connected respectively to the second and fifth flip flops and an output connected to the serial shifting input of the shift register, the feedback means for the six flip flop shift register comprising an exclusive OR gate having two inputs connected respectively to the first and sixth flip flops and an output connected to the serial shifting input of the shift register, the feedback means for the seven flip flop shift register comprising an exclusive OR gate having two inputs connected respectively to the first and seventh flip flops and an output connected to the serial shifting input of the shift register.

8. A random integer generator in accordance with claim 7 including reset means comprising a reset circuit connected to the first flip flop in each of said shift registers and adapted to be selectively connected to a source of voltage for loading ones in the first flip flops of all of said shift registers.

9. A random integer generator comprising a plurality of pseudo-random generators, each of said pseudo-random generators comprising a shift register formed of a plurality of flip flops and having feedback whereby the sequence of the shift register has a period $p = 2^n - 1$ where $n$ = the number of flip flops in the shift register, clock means for simultaneously applying clocking pulses to said pseudo-random generators whereby they shift bits of information simultaneously, said pseudo-random generators each being of a different sequence length from each other, summing means for counting the number of ones in a selected sample size of the outputs from each pseudo-random generator and forming the sum thereof whereby the sum is a random integer, said summing means including a first set of full adders, one for each of the pseudo-random generators for summing the ones in the selected sample size of the outputs of their pseudo-random generator to form first sums and a second set of full adders for summing the first sums to form a second sum which is the random integer output.

10. A random integer generator in accordance with claim 9 wherein each of said full adders is formed of threshold logic circuitry having four inputs $I_1$, $I_2$, $I_3$, $I_4$, two carry-ins $C_i1$, $C_i2$, and three outputs $\overline{0}_1$, $0_2$, $0_3$, and including first, second, third, fourth and fifth threshold logic gates, said $I_1$, $I_2$, $I_3$ and $I_4$ inputs being coupled as one weighted inputs to said first, second and third threshold logic gates, said $C_i1$, and $C_i2$ inputs being coupled as one weighted inputs to said fourth threshold logic gate, said first second and fourth threshold logic gates having respective threshold levels of 2, 4 and 2 and each having an output and an inverted output, said third threshold logic gate having a threshold level of 5 and having the inverted outputs of said first and second threshold logic gates as two weighted inputs and the inverted output of said fourth threshold logic gate as a one weighted input, said fifth threshold logic gate having a threshold of 2 and having as one weighted inputs the output of the first threshold logic gate, the inverted output of said second threshold logic gate and the output of said fourth threshold logic gate, the outputs of said third, fifth and second threshold logic circuits being respectively said $0_1$, $0_2$ and $0_3$ outputs.

11. A random integer generator in accordance with claim 9 wherein each of said full adders is formed of threshold logic circuitry having four inputs $I_1$, $I_2$, $I_3$, $I_4$, two carry-in inputs $C_i1$, $C_i2$ and three outputs $0_1$, $0_2$ and $0_3$, and including first and second threshold logic gates, said first threshold logic gate having an output with a threshold of 7 and having three inverted outputs for thresholds of 2, 4 and 6 respectively, said first threshold logic gate having as one weighted inputs $I_1$, $I_2$, $I_3$, $I_4$, $C_i1$ and $C_i2$, and having as two weighted inputs the inverted outputs for threshold of 2, 4 and 6 respectively, said two weighted inputs only being effective with respect to the output with a threshold of 7, said inverted outputs with thresholds of 2, 4 and 6 respectively being one weighted inputs to said second threshold logic gate with the inverted outputs for thresholds of 2 and 6 respectively being re-inverted upon entering said second threshold logic gate, said second threshold logic gate having a threshold of 2, the output of said first threshold logic gate for a threshold of 7 being output $0_1$, the output of said second threshold logic gate for a threshold of 2 being output $0_2$, and the inverted output of said first threshold logic gate for a threshold of 4 being output $\overline{0}_3$.

12. A random integer generator in accordance with claim 11 including a third threshold logic gate having a threshold value of one and having $\overline{0}_3$ as a one weighted input and having an inverted output which is output $0_3$.

13. A method of generating random integers utilizing a plurality of pseudo-random generators of the type comprising shift registers having feedback whereby the sequence of the shift registers respectively have a period $p = 2^n - 1$ where $n$ = the number of flip flops in the respective shift register comprising the steps of simultaneously clocking a plurality of times the plurality of pseudo-random generators so that they simultaneously shift bits of information a plurality of times, counting the number of ones or zeros for a selected sample size of the flip flops in the shift registers of the pseudo-random generators after they have been clocked a plurality of times and summing the said ones or zeros whereby the sum is a random integer.

14. A method in accordance with claim 13 wherein the pseudo-random generators are repeatedly clocked prior to summing the ones or zeros for a selected sample size of the flip flops.

15. A method in accordance with claim 13 wherein the ones and zeros in the selected sample size of the flip flops are alternately summed to form alternate random integers.

* * * * *